United States Patent [19]

Besenhard et al.

[11] Patent Number: 4,547,442

[45] Date of Patent: Oct. 15, 1985

[54] LITHIUM BATTERY ELECTRODE FRAME

[75] Inventors: Jürgen O. Besenhard, Neusäss; Erich Wudy; Heinz P. Fritz, both of Garching, all of Fed. Rep. of Germany

[73] Assignee: Varta Batterie Aktiengesellschaft, Hanover, Fed. Rep. of Germany

[21] Appl. No.: 515,649

[22] Filed: Jul. 21, 1983

[30] Foreign Application Priority Data

Aug. 16, 1982 [DE] Fed. Rep. of Germany ....... 3230410

[51] Int. Cl.$^4$ ............................................. H01M 4/00
[52] U.S. Cl. .................... 429/209; 429/218; 429/233; 429/245
[58] Field of Search ............... 429/233, 101, 105, 218, 429/245, 209

[56] References Cited

U.S. PATENT DOCUMENTS

| | | | |
|---|---|---|---|
| 3,881,951 | 5/1975 | McCoy | 429/218 |
| 4,056,885 | 11/1977 | Rao | 429/218 |
| 4,264,690 | 4/1981 | Rao | 429/245 |
| 4,307,162 | 12/1981 | Athearn | 429/101 |
| 4,434,213 | 2/1984 | Niles et al. | 429/218 |
| 4,456,666 | 6/1984 | Otto et al. | 429/245 |

*Primary Examiner*—Anthony Skapars
*Attorney, Agent, or Firm*—Weiser & Stapler

[57] ABSTRACT

Durable mechanical and electronic contact is achieved between the support frame of a battery electrode and its active material A, whose electro-chemical capacity is utilizable to a very high degree, by providing the base material $M_1$ of the support frame, which is not itself capable of being alloyed with A, with a cover layer of a metal $M_2$ that is capable of being alloyed with $M_1$, as well as being capable of being alloyed with A. This results in an alloy region $M_1.M_2$, within which the alloying reaction with A comes to a halt. The contact region corresponds to the scheme $M_1/M_1.M_2.A/A$. Alternatively, the active material can itself be an alloy of $M_2$ and A, in accordance with $M_1/M_1.M_2.A/M_2.A$.

13 Claims, No Drawings

LITHIUM BATTERY ELECTRODE FRAME

The invention relates to a support and take-off conductor frame, or skeleton, for battery electrodes with metallic or metal containing active masses. As masses which fall into this category, lithium and its alloys, in particular, have been used with good results for the negative electrodes of primary and secondary batteries having high energy density with aprotically dissolved, molten, or solid electrolytes.

A problem region within such a lithium-containing active mass is the contact: active mass/inert support and take-off conductor frame. Also the adhesion of the active mass to the support frame is insufficient, on the one hand while, on the other hand, the electrical resistance in the contact region is too high.

The cause of these difficulties is the high chemical reactivity of lithium, or its alloys. In the presence of traces of moisture or oxygen, and even in nitrogen or in highly purified polar organic solvents, these substances become coated with decomposition products which are no longer electrically conductive. As expected, the adhesion to the support frame of such regions coated with decomposition products of metallic or alloyed lithium is poor.

The above-mentioned difficulties prevail particularly in rechargeable batteries because, starting with the first deep discharge, the contact surface: active material/frame, which was produced with care during assembly of the battery (e.g. by pressing on in a protective gas atmosphere) becomes part of the reaction region, and suffers irreversible damage.

A peculiarity of the element lithium resides in that, even at room temperature, it "alloys electro-chemically" with many metals. In other words, during cathodic deposition upon a metal electrode M, it promptly alloys into $Li_xM$ with same. Examples of such metals and semi-conductors which alloy with lithium even at room temperature are As, Sb, Bi (J. O. Besenhard and H. P. Fritz, Electrochim. Acta. 20 (1975) 513) or Al (J. O. Besenhard, J. Electroanal. Chem. 94 (1978) 81) and also Na, Rb, Cs, Be, Mg, Ca, Sr, Ba, B, Ga, In, Tl, C, Si, Ge, Sn, Pb, Se, Te, Zn, Cd, Hg, as well as numerous lanthanide and actinide metals. Due to such alloy formations, a good mechanical and electronic contact is produced between the deposited lithium, or the resulting intermetallic compound $Li_xM$, and the subjacent metal M.

Indeed it can be shown that lithium, which is cathodically alloyed, for example, into an aluminum subtrate does not quickly lose—as is common during cathodic deposition upon an inert substrate—the electronic contact with the substrate due to corrosion products at the boundary: lithium/inert substrate (J. O. Besenhard and H. P. Fritz, Electrochim. Acta. 20 (1975) 513).

When used as an electrode, this becomes noticeable because lithium which has been cathodically alloyed into aluminum can again be liberated (in the form of $Li^+$ ions) almost without loss anodically through current reversal, after week-long storage in electrolyte solution (e.g. in a 1 M solution of $LiClO_4$ in propylene carbonate). A correspondingly stored deposit of lithium on an inert base (e.g. Fe, Mo, Ni, Cu, Ti) is no longer electro-chemically very active, and therefore no longer constitutes a usable battery electrode.

The tests described, including the storage capability of lithium alloyed into aluminum, were carried out with greatly over-dimensioned Al substrates, that is, the $Li_xAl$ alloy (with x close to 1) grown into pure Al. For practical applications, the quantity of unused Al must of course be kept low. If the Al is only slightly over-dimensioned, there remains an Al layer which is mechanically still stable, beneath the porous and mechanically no longer stable LiAl, which can take over the function of the support and take-off conductor frame. This creates a usable electrode, but one whose life is limited to a few charge/discharge cycles. That is because the aluminum which is not alloyed, but intended to serve as support, is then drawn into the alloy reaction, whereas powder-like Al which is mechanically no longer stable remains unused at other places within the electrode, due to insufficient contact.

Consequently, such lithium alloy electrodes also require a material suitable for an inert support and take-off conductor frame, and embodiments thereof have previously been published (H. B. Fritz and J. O. Besenhard, German Patent Publication (Offenlegungsschrift) No. 2 834 485). At the boundary layer: Li alloy/inert support and take-off conductor frame, there do, of course, now arise difficulties similar to those at the boundary layer: Li/inert support and take-off conductor frame. In other words, in this case, too, the mechanical and electronic contact becomes unsatisfactory, even after a single complete reaction of the active mass (e.g. LiAl).

Thus, neither materials which are inert with respect to lithium (such as Mo, Ti), nor materials which alloy with lithium (such as Al, Sb, Bi) are completely suitable in their pure form as the raw material for a support and take-off conductor frame.

Accordingly, it is an object of the present invention to provide a support and take-off conductor frame for battery electrodes, e.g. having lithium or lithium alloys as the active material, which definitely assures the exhaustive electro-chemical utilization of the active material over a long cyclic charge/discharge operation, and provides sufficient mechanical and electrical contact with that material.

This and other objects which will appear are achieved in accordance with the invention by introducing between the base material $M_1$ of the support and take-off conductor frame, and the active material A, an intermediate layer $M_2$ which forms an alloy with $M_1$ and with A.

In other words, the following situation is created: the interior of the support frame consists of a metal $M_1$ which is not alloyable with the active material A (e.g. lithium), whereas its surface consists of a metal $M_2$ which is alloyable with the active material A, so that between $M_1$ and $M_2$ there exists an alloy region $M_1.M_2$ within which the alloy reaction of A with $M_2$ comes to a halt.

In investigating the electro-chemical alloy formation of metals M, or of alloys $M_1M_2 \ldots M_n$, where n denotes the number of components, it was surprisingly found that it is possible to influence the quantity and rate of formation of the alloy $Li_xM$ or $Li_x(M_1M_2 \ldots M_n)$. It is possible to "brake" this alloy formation or even to bring it to a complete halt, through the introduction of transport-retarding components into the lattice of the metal M capable of alloying with Li.

Building upon these findings, it is possible, in particular, to construct support and take-off conductor frames with a non-alloying core, an alloying surface, and a transition region in which the alloying reaction slowly comes to a halt, without there arising a sharp boundary between the inert take-off conductor and the active mass. Such support and take-off conductor frames are distinguished by exceptional mechanical and electronic contact with the active mass, and by accompanying chemical stability even after many repetitions of charging and discharging.

By these inventive measures, the two-dimensionality of the classical contacts: "inert support and take off conductor material/active material" is extended into three-dimensionality. In that three-dimensional contact region there arise concentration gradients of $M_1$, $M_2$ and A. Thus, the basic concept of the invention is to provide an alloy connection between metals which do not alloy with each other, on the one hand with the support frame ($M_1$), and on the other hand with the electro-chemical active metal (A), via an intermediate metal ($M_2$), which forms alloys both with $M_1$ and with A. The contact region therefore corresponds to the following scheme: $M_1/M_1.M_2.A/A$.

It is particularly desirable that the active material itself be an alloy of $M_2$ and A. This creates an alternative scheme for the contact region of the form $M_1/M_1.M_2.A/M_2.A$, which prevails, for example, in the electrodes described below having LiAl as the active mass. Of course, the metals $M_1$, $M_2$ and A can, also be present in the form of mixtures, e.g. $M_1+M_1'+\ldots, M_1{}^{n'} M_2+M_2'+\ldots M_2{}^{n'}+A+A'+\ldots A^{n'}$, where n denotes the number of components.

Further below, there are also described processes for the manufacture of such frames with three-dimensional contact region.

By way of example and without limitation, the invention is explained in what follows with reference to the system in which the inert metal $M_1=Ti$, the alloy base metal $M_2=Al$ and the active metal $A=Li$, which is also present in the electrolyte solution in the form of an $Li^+$ salt. For $M_1$ and $M_2$, as well as for A, alternatives are available—for example, Na from $Na^+$ containing aprotic electrolytes can be alloyed into Hg, Pb or Tl.

Likewise, the choice of the electrolyte is not limited to aprotic solutions which contain cations of the active material A. The advantages of support and take-off conductor frames in accordance with the invention are also achievable with molten or solid electrolytes which contain the $A^{n+}$ cations.

To prepare a layer of Al-Ti alloy upon a Ti core and with a concentration profile in the alloy layer which takes on increasing values for Ti toward the interior, and for Al toward the exterior, one preferably starts with an Al-coated Ti sheet. Because both Al and Ti become coated with oxide layers under the influence of the atmosphere, the coating of Ti with Al requires certain precautions. Particularly good coating of Ti with Al can be achieved if the Ti surface is freed from surface oxides by means of an ion beam gun in a vacuum. Upon the Ti surface which is thus laid bare, aluminum can immediately thereafter be vapor deposited in a high vacuum, or "sputter"-deposited. Less costly is the evaporative deposition of Al upon Ti surfaces which have been freed of surface oxides immediately before the evaporative deposition process, e.g. by oxalate-or fluoride-containing etching solutions. Also, "fire aluminizing" of Ti can be carried out through brief immersion of Ti in molten Al. To remove the oxides from the Ti, it is desirable in that case to use molten alkali halogenides as cleaning media, e.g. by overlaying the molten Al with a molten mixture of LiCl with some LiF, or by underlaying the molten Al with molten RbF or CsF. The aluminizing can proceed continuously, for example by having a Ti tape pass first through the salt melt, and then through the liquid Al. Al layers on Ti are also produced by electro-chemical deposition of Al upon Ti from melts of $AlCl_3$ plus NaCl or LiCl—or from liquid complex compounds of the type M [Al $R_3$ F] (where M=Na, K, Rb, Cs, and R=alkyl)—according to K. Ziegler and H. Lehmkuhl, Z: anorg. allg. Chem. 283 (1956) 414, M=Na and $R=C_2M_5$ are particularly suitable. Less well adherent, but still suitable layers of Al upon Ti can also be obtained by rolling, or pressing of Al foil or Al powder upon Ti. Preferably, the thickness of the Al layer is chosen in the range of a few micrometers ($\mu$m).

All the previously mentioned processes indeed yield Al-coated Ti, but not yet a Ti-Al Alloy region in accordance with the invention. This is obtained only through heat treatment of the Al layers on Ti, and this must be done in a protective gas (preferably Ar). To obtain the desired alloy region, temperatures in the neighborhood of the melting point of Al are sufficient. The required duration of the heat treatment is in the range of a few minutes.

This heat treatment completes the preparation of the support and take-off conductor frames embodying the invention. They are immediately usable, provided it is intended to use them as the armature for electrodes of metallic Li, or as the frame for the galvanic deposition of metallic Li from dissolved-in-liquid, molten, or solid electrolytes. If it is not Li, but rather a Li alloy (e.g. LiAl) which is to be applied as the active mass, then there are mainly two different possibilities.

(a) The alloy base metal (Al) is applied, for example, by sintering-on of Al powder. Thereafter, the active metal LiAl is produced from the alloy base metal through electro-chemical alloying in $Li^+$ electrolytes.

(b) The active material LiAl is not produced upon the electrode, but, for example, through melting together of Li and Al in a noble metal container. Pulverized LiAl is then sintered onto a support and take off conductor frame embodying the invention.

In the first-mentioned process it is desirable, in order to increase the mechanical strength and electronic conductivity of the active mass which is later to be formed from the alloy base metal, to also add, to the Al powder, metals which do not alloy with Li (e.g. Ni, Mo, Ti) in the form of powder or thin wire. In the second-mentioned process (sintering-on of LiAl), there should also be mixed-in such metals which do not alloy with Li—in this case the LiAl alloy. Furthermore, care should be taken that there exists in the LiAl alloy an excess of Al (about 5–10% of atoms).

ILLUSTRATIVE EXAMPLES

Example 1

Ti foil (50 $\mu$m thickness) is boiled for a short period with 20% by volume of concentrated HCl and 20% by volume of concentrated HCOOH in order to remove the surface oxides. It is then rinsed with distilled water and subsequently heated in order to roughen it in a solution of 20% by weight of oxalic acid dihydrate in water, from which oxygen has previously been removed by boiling. After rinsing with distilled water and acetone, the Ti foil is immediately placed in the vacuum chamber of an evaporative deposition unit and is vapor coated on one side with about 5 $\mu$m of aluminum. After the evaporation process, the Al coated foil is introduced, if possible without contacting the atmosphere, into an oven filled with protective gas (Ar) and is held at 650° C. for about 15 minutes. During this period, there takes place the alloying of the vapor-deposited Al with Ti.

To the support and take-off conductor frame embodying the invention which is produced in this manner, there is sintered Al powder in a layer thickness of about 0.5 mm at about 600° C. in an Ar atmosphere.

During cycling tests in a 1 M solution of $LiClO_4$ in propylene carbonate at a current density of 1 mA cm$^{-2}$, such Ti-supported Al electrodes have survived about 15 overcharge deep discharge cycles (i.e., cycling conditions in which the contact region: frame/active material becomes the reaction region) without losing their operating capability.

Comparative investigations using Al vapor-coated Ti frames which had not been subjected to the heat treatment causing the TiAl alloying, yielded dramatically poorer results. After two overcharge/deep discharge cycles, the electrode was incapable of functioning.

Ni-supported Al electrodes which were produced through galvanic deposition of Al (from $NaF.2AlR_3$ electrolyte) became useless even after the first overcharge.

If the sintering-on of the approximately 0.5 mm thick layer of Al powder is omitted, then there is obtained a support and takeoff conductor frame which is already suitable in that form for the galvanic deposition of metallic lithium, and which distinguishes itself by particularly strong adherence of this deposit.

Example 2

Upon a support and take-off conductor frame prepared as in Example 1, LiAl powder, doped with about 5-10% atoms of Al powder, is sintered at about 600° C. in an Ar atmosphere.

Example 3

Without achieving optimum results, comparable support frames can be obtained with substantially less effort, if the Ti surface is roughened and cleaned only mechanically, if there is applied to the Ti surface, pretreated in that manner, Al powder in a uniform layer of approximately 0.5 mm thickness, and if there is triggered through brief heating in an Ar atmosphere to about 700°-800° C. the formation of a narrow region of a TiAl alloy.

Example 4

The mechanical stability and the conductivity of the active mass of electrodes according to Example 1, 2, and 3 can be increased to the detriment of their energy density, if the approximately 0.5 mm thick layer of Al powder (or LiAl powder doped with Al powder) is doped prior to sintering with metals which do not alloy with Li (e.g. Mo, Ni, Ti) in the form of powder, or of segments (about 3 mm long) of thin wire (about 50 μm thick).

Example 5

The adhesion of the active mass to the support and takeoff conductor frame can be further improved if, in place of the smooth Ti foil, a sculptured Ti base metal is used. This can be produced by puncturing Ti foil with thin steel pins, so that a "grater"-like structure is created. Fine-mesh Ti expanded metal can also be used as "bulk" support and take off conductor frame. Thereafter one proceeds appropriately as in Example 1. The Al layer is applied to the roughened side.

We claim:

1. A support and take-off conductor frame for battery electrodes having a metal or a metal containing active mass, wherein a cover layer $M_2$ overlies the base material $M_1$ of the support and take-off conductor frame, said layer $M_2$ being capable of forming an alloy both with $M_1$ and with an active material A overlying said layer $M_2$.

2. The frame of claim 1 wherein the active material is itself an alloy of $M_2$ and A.

3. The frame of claim 1 wherein the base material $M_1$ is an alloy $M_1+M_1'+\ldots M_1^{n'}$, the material $M_2$ is an alloy $M_2+M_2'+\ldots M_2^{n'}$ and the active material is an alloy $A+A'\ldots N^{n'}$.

4. The frame of claim 2 wherein $M_1$ is the element titanium, $M_2$ is the element aluminum, and A is the element lithium.

5. A battery electrode comprising the frame of claim 1.

6. The electrode of claim 5, whose method of manufacture includes the steps of applying the layer of $M_2$ to the base material $M_1$, and
    subjecting the resulting structure to heat treatment to produce the $M_1M_2$ alloy.

7. The electrode of claim 6, whose method of manufacture includes the further step of applying the material A to the structure so as to alloy A with at least the $M_2$ of said structure.

8. The frame of claim 1 wherein the base material $M_1$ is not alloyable with the active material A.

9. The frame of claim 1 wherein a transition region separates the alloying surfaces of the layer $M_2$ and the active material A.

10. The frame of claim 9 wherein the layer $M_2$ has a lattice structure incorporating transport-retarding components, for regulating the alloying of the layer $M_2$ with the active material A in said transition region.

11. The frame of claim 9 wherein said support and take-off conductor frame includes a non-alloying core, an alloying surface, and a transition region in which said alloying reaction progressively comes to a halt.

12. The frame of claim 1 wherein said active material A further includes a metal which does not alloy with the active material A.

13. A support and take-off conductor frame for battery electrodes having a metal or a metal contianing active mass, wherein a cover layer $M_2$ overlies the base material $M_1$ of the support and take-off conductor frame, said layer $M_2$ forming an alloy both with $M_1$ and with an active material A overlyng said layer $M_2$.

* * * * *